United States Patent
Sano et al.

(10) Patent No.: US 8,860,340 B2
(45) Date of Patent: Oct. 14, 2014

(54) FAN MOTOR DRIVING DEVICE AND COOLING DEVICE USING THE SAME

(75) Inventors: Shinsuke Sano, Kyoto (JP); Toshiya Suzuki, Kyoto (JP)

(73) Assignee: Rohm Co., Ltd. (JP)

( * ) Notice: Subject to any disclaimer, the term of this patent is extended or adjusted under 35 U.S.C. 154(b) by 105 days.

(21) Appl. No.: 13/370,402

(22) Filed: Feb. 10, 2012

(65) Prior Publication Data
US 2012/0207619 A1      Aug. 16, 2012

(30) Foreign Application Priority Data
Feb. 10, 2011   (JP) ................... 2011-027850

(51) Int. Cl.
*H02P 1/00*   (2006.01)
*F04D 27/00*   (2006.01)

(52) U.S. Cl.
CPC .................. *F04D 27/004* (2013.01)
USPC ...... 318/280; 318/257; 318/400.32; 318/373; 318/811

(58) Field of Classification Search
CPC ......... H02P 23/0072; H02P 3/00; H02P 3/04; H02P 3/18
USPC ...... 318/400.32, 373, 811, 280, 257
See application file for complete search history.

(56) References Cited

U.S. PATENT DOCUMENTS

| | | | | |
|---|---|---|---|---|
| 6,025,683 A | * | 2/2000 | Philipp | 318/257 |
| 6,922,032 B2 | * | 7/2005 | Maeda | 318/373 |
| 7,304,452 B2 | * | 12/2007 | Nagai et al. | 318/811 |
| 2003/0025469 A1 | * | 2/2003 | Zhou et al. | 318/34 |
| 2006/0220603 A1 | * | 10/2006 | Takeuchi | 318/280 |

FOREIGN PATENT DOCUMENTS

| | | |
|---|---|---|
| JP | 07-031190 A | 1/1995 |
| JP | 2001-284868 A | 10/2001 |

* cited by examiner

*Primary Examiner* — Eduardo Colon Santana
*Assistant Examiner* — Bickey Dhakal
(74) *Attorney, Agent, or Firm* — Cantor Colburn LLP

(57) ABSTRACT

The present invention is provided to remove dust that adhered to a cooling fan. A plurality of comparators are disposed for each of a plurality of coils, respectively, and generates a back electromotive force sensing signal denoting a comparison result by comparing a back electromotive force appearing at one end of each corresponding coil with a neutral-point voltage of the coils. A driving signal synthesis circuit generates a driving control signal used to enable the fan motor to proceed the following actions: (i) enabling the fan motor to rotate toward the opposite direction as a normal operation within a specific reverse rotation period after a driving of the fan motor is started, (ii) applying a brake to the fan motor within a braking period, and (iii) enabling the fan motor to rotate toward a direction of normal operation in a normal driving period. A driving circuit drives the fan motor.

4 Claims, 4 Drawing Sheets

US 8,860,340 B2

FAN MOTOR DRIVING DEVICE AND COOLING DEVICE USING THE SAME

BACKGROUND OF THE INVENTION

1. Field of the Invention

The present invention relates to a fan motor driving technology.

2. Description of the Related Art

A computing speed of large scale integrated circuit (LSI) such as central processing unit (CPU) and digital signal processor (DSP) is increased incessantly due to high speed of a personal computer or a workstation over recent years. However, heat generation of the LSI also becomes high as both the computing speed and clock frequency become high. The heat generation from the LSI may induce thermal runaway itself or affect peripheral circuits. Therefore, a suitable thermal cooling of a heat generation body as the representative LSI becomes a very important technology.

A technical example used to cool the LSI may be an air cooling method using a cooling fan. In the above method, for example, the cooling fan is disposed opposite to a surface of the LSI, thereby blowing a cold air toward the surface of the LSI.

Patent Document 1: Japanese Patent Publication No. 7-31190
Patent Document 2: Japanese Patent Publication No. 2001-284868

SUMMARY OF THE INVENTION

Problems to be Solved by the Invention

While a stop state of a cooling fan continues with a longer duration, dust that adhered to a cooling fan may reduce life span of the cooling fan.

The present invention has been proposed under the circumstances described above. An objective of the present invention is to provide a fan motor driving device which is capable of removing dust of the cooling fan.

Technical Means for Solving the Problems

A driving device for a multi-phase sensorless fan motor having a plurality of coils according to an embodiment of the present invention includes: a plurality of comparators, disposed for each of the coils, respectively, and for generating a back electromotive force sensing signal denoting a comparison result by comparing a back electromotive force appearing at one end of each corresponding coil with a neutral-point voltage of the coils; a driving signal synthesis circuit, according to an output signal of the comparators, for generating a driving control signal used to enable the fan motor to proceed the following actions: (i) enabling the fan motor to rotate toward the opposite direction as a normal operation within a specific reverse rotation period after a driving of the fan motor is started, (ii) applying a brake to the fan motor within a braking period, and (iii) enabling the fan motor to rotate toward a direction of normal operation in a normal driving period; and a driving circuit, for driving the fan motor according to the driving control signal.

According to the above embodiment, dust as attachment can be removed from a fan by enabling the fan motor to rotate toward the opposite direction as the normal operation before the normal operation of the fan motor. Furthermore, the attachment also can be removed by a torque used to reduce a rotation speed of the fan motor even if it is in the breaking period after the reverse rotation.

The driving signal synthesis circuit includes: a first control pattern generation portion, for outputting a first control pattern used to enable the fan motor to rotate toward a first direction; a second control pattern generation portion, for outputting a second control pattern used to enable the fan motor to rotate toward a second direction opposite to the first direction; and a synthesis portion, for generating the driving control signal in synchronization with the output signal of the comparators according to the first control pattern while enabling the fan motor to rotate toward the first direction, and for generating the driving control signal in synchronization with the output signal of the comparators according to the second control pattern while enabling the fan motor to rotate toward the second direction.

An embodiment of the driving device further includes a forward/reverse rotation control portion, which receives a direction control signal used to assign the rotation direction of the fan motor in the normal operation and switches the rotation direction of the fan motor according to the direction control signal.

The other embodiment of the present invention is a cooling device, which includes: a sensorless fan motor; and a motor driving device according to any of the above embodiments for driving the sensorless fan motor.

Moreover, an embodiment obtained from a mutual replacement between any combinations of the above constituent elements, the constituent elements of the present invention, and those exhibited in method, device, or system is also effective.

Effect of the Invention

According to the above embodiments of the present invention, foreign matters that adhered to the fan motor can be removed preferably.

Other features and advantages of the present invention will become more apparent from the detailed descriptions given below with reference to the accompanying drawings.

DETAILED DESCRIPTION OF THE INVENTION

The present invention based on the preferred embodiment is described below with reference to the accompanying drawings. The same or equal element, part, or process, contained in each of the accompanying drawings, will be denoted by a same symbol, and the repeat descriptions for them will be omitted suitably. Furthermore, the embodiment should not be limited to the illustrations of the invention. In other words, all of the features and the combinations thereof mentioned in the embodiment are not necessarily the same as the substantive features of the invention.

In the specification, so-called connection between part A and part B includes a directly connection between part A and part B in physically and an indirectly connection between part A and part B through other part that does not affect their electrically connection substantially or does not damage the performance or effect of their combination.

Similarly, so-called a state of part C disposing between part A and part B includes a directly connection between part A and part C or between part B and part C and an indirectly connection between them through other part that does not affect their electrically connection substantially or does not damage the performance or effect of their combination.

A fan motor driving device installed in an electronic calculating machine such as personal computer or workstation and used to drive a fan motor for cooling CPU can be used to describe an embodiment with respect to the present invention.

Figure 1:
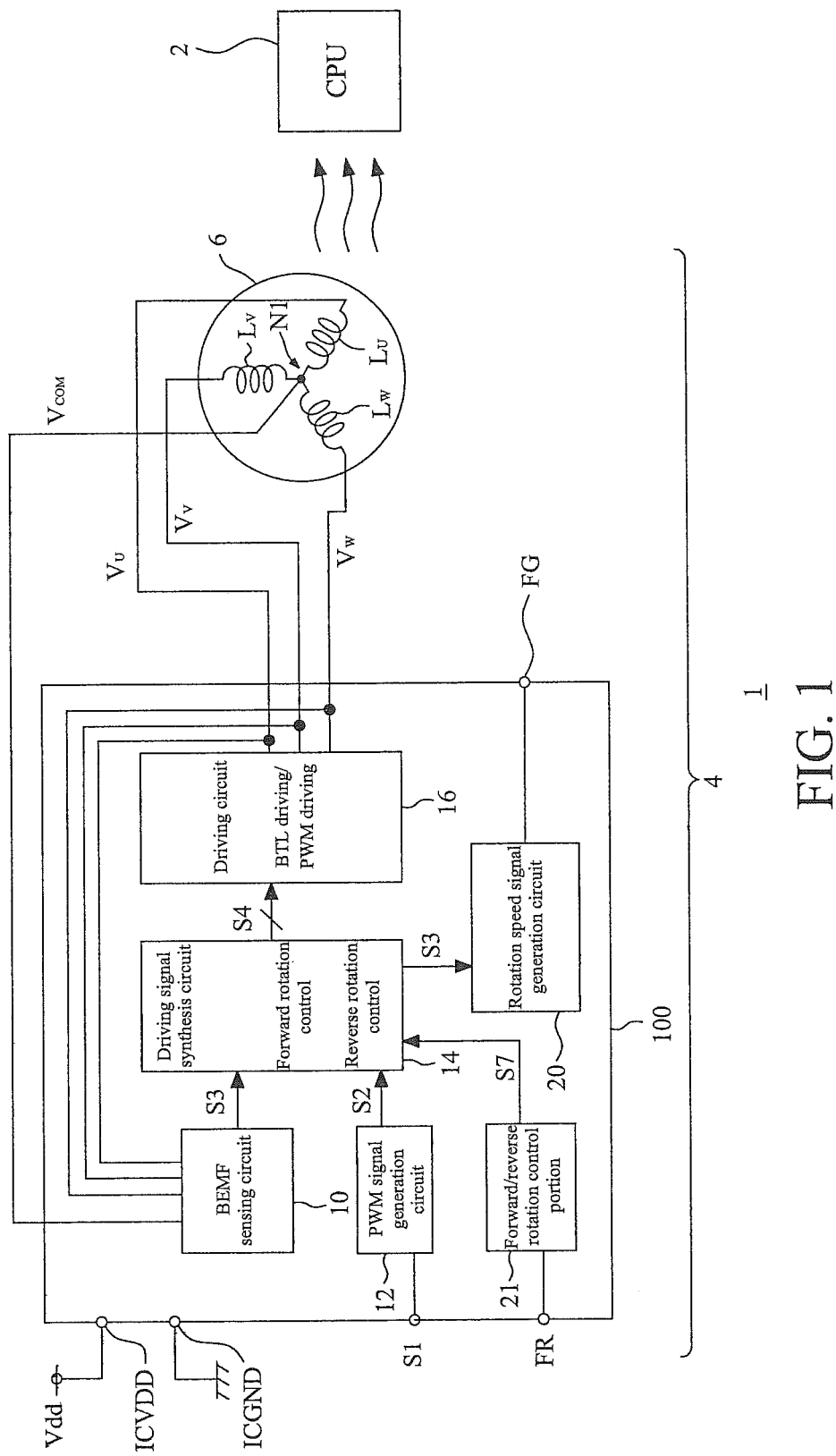
FIG. 1 is a block diagram of electronic machine including a cooling device according to a preferred embodiment of the present invention.

First, an embodiment of a driving device 100 will be described in detail with reference to FIG. 1. The driving device 100 is installed in a cooling device 4 having a senseless fan motor and drives the fan motor. FIG. 1 is a block diagram of electronic machine 1 including a cooling device 4 according to a preferred embodiment of the present invention.

The electronic machine 1 is a calculating machine such as personal computer or workstation or a household appliance such as refrigerator or television, and includes a cooling target such as CPU 2. The cooling device 4 cools the CPU 2 via air blowing.

The cooling device 4 includes a driving device 100 and a fan motor 6. The fan motor 6 is disposed near the cooling target CPU 2. The driving device 100 drives the fan motor 6 according to a control input signal (it will be referred to as control signal below) S1 used to indicate a torque (rotation speed) of the fan motor 6. The cooling device 4 is in sales and circulation after modularization.

The fan motor 6 is a three-phase AC motor which includes a U-phase coil $L_U$, a V-phase coil $L_V$, a W-phase coil $L_W$ and a permanent magnet (not shown in the drawings), and the coils are in star connection. In the present embodiment, the fan motor 6 has four magnetic poles.

The driving device 100 is a functional integrated circuit (IC) integrated on a semiconductor substrate. A power source voltage and a ground voltage are supplied to a power source terminal ICVDD and a ground terminal ICGND, respectively.

The driving device 100 includes a back electromotive force (BEMF) sensing circuit 10, a pulse width modulation (PWM) signal generation circuit 12, a driving signal synthesis circuit 14, a driving circuit 16, a rotation speed signal generation circuit 20, and a forward/reverse rotation control portion 21.

The PWM signal generation circuit 12 outputs a PWM control signal S2 obtained through pulse width modulation according to a target torque (the same as a target rotation speed) of the fan motor 6. A control signal S1 obtained through pulse width modulation also can be input to the PWM signal generation circuit 12 according to the target torque of the fan motor from an exterior of the driving device 100, then the PWM signal generation circuit 12 outputs it as the PWM control signal S2. Perhaps the PWM signal generation circuit 12 can receive an analog voltage corresponding to an ambient temperature Ta obtained by using a thermistor, thereby generating the PWM control signal S2 with a duty cycle corresponding to the analog voltage. Perhaps the PWM signal generation circuit 12 can receive a digital signal denoting a duty cycle from the CPU as main processor, thereby generating the PWM control signal S2 corresponding to the digital signal.

The BEMF sensing circuit 10 compares back electromotive forces $V_U$, $V_V$, $V_W$ appearing at one end of the U-phase coil $L_U$, the V-phase coil $L_V$, and the W-phase coil $L_W$, respectively, with a neutral-point voltage $V_{COM}$ appearing at a common connection node N1 of the three coils, thereby generating a verified rotation sensing signal S3 every other electrical angle of 60°. For example, the BEMF sensing circuit 10 includes comparators (not shown in the drawings) disposed for the U-phase, the V-phase, and the W-phase, respectively. Each of the comparators compares a coil voltage (the same as the back electromotive force) $V_U$, or $V_V$, or $V_W$ appearing at one end of each corresponding coil with the neutral-point voltage $V_{COM}$, thereby generating a signal denoting a comparison result. The rotation sensing signal S3 can be generated from performing a logic synthesis for the signals output from each phase comparator.

The driving signal synthesis circuit 14 receives the rotation sensing signal S3 and the control signal S2, and synthesizes them to generate a driving control signal S4. Furthermore, the driving signal synthesis circuit 14 switches a driving sequence of the fan motor 6 immediately after turning the driving device 100 on.

The driving circuit 16 applies a driving voltage to one end of the coils $L_U$, $L_V$, $L_W$ according to the driving control signal S4. The driving circuit 16 can perform a BTL driving for the fan motor 6 and perform a PWM driving according to the input signal S1.

The rotation speed signal generation circuit 20 generates a migrated rotation speed signal FG and outputs it from a FG terminal every other mechanical angle (motor angle) of 180° of the fan motor 6, i.e. the fan motor 6 rotates half a circle.

The forward/reverse rotation control portion 21 receives a direction control signal FR from the exterior. The cooling device 4 can set a rotation direction of normal operation of the fan motor 6 according to the direction control signal FR. The forward/reverse rotation control portion 21 outputs a signal S7 that corresponds to the rotation direction denoted by the direction control signal FR to the driving signal synthesis circuit 14. For example, the signal S7 is a low level while the direction control signal FR indicates a first direction, and the signal S7 is a high level while the direction control signal FR indicates a second direction.

The driving signal synthesis circuit 14 generates the driving control signal S4 used to drive the fan motor 6 according to the rotation sensing signal S3 from the BEMF sensing circuit 10 by means of the following sequence: (i) enabling the fan motor 6 to rotate toward the opposite direction as a normal operation after turning the driving device 100 on, i.e. within a specific reverse rotation period after a driving of the fan motor 6 is started; (ii) applying a brake to the fan motor 6 in reverse rotation within a braking period, thereby reducing the rotation speed of the fan motor 6; and (iii) enabling the fan motor 6 to rotate toward a direction of normal operation in a normal driving period.

As mentioned above, the driving device 100 shown in FIG. 1 can set the rotation direction of normal operation according to the direction control signal FR. While the direction control signal FR indicates the first direction in the normal operation, the driving signal synthesis circuit 14 generates the driving control signal S4 in a manner enabling the fan motor 6 to rotate toward the second direction within the reverse rotation period. Then, the rotation speed of the fan motor is reduced within the breaking period; the driving control signal S4 is generated in a manner enabling the fan motor 6 to rotate toward the first direction in the normal driving period.

Contrariously, while the direction control signal FR indicates the second direction in the normal operation, the driving signal synthesis circuit 14 generates the driving control signal S4 in a manner enabling the fan motor 6 to rotate toward the first direction within the reverse rotation period. Then, the rotation speed of the fan motor is reduced within the breaking period; the driving control signal S4 is generated in a manner enabling the fan motor 6 to rotate toward the second direction in the normal driving period.

Figure 2:
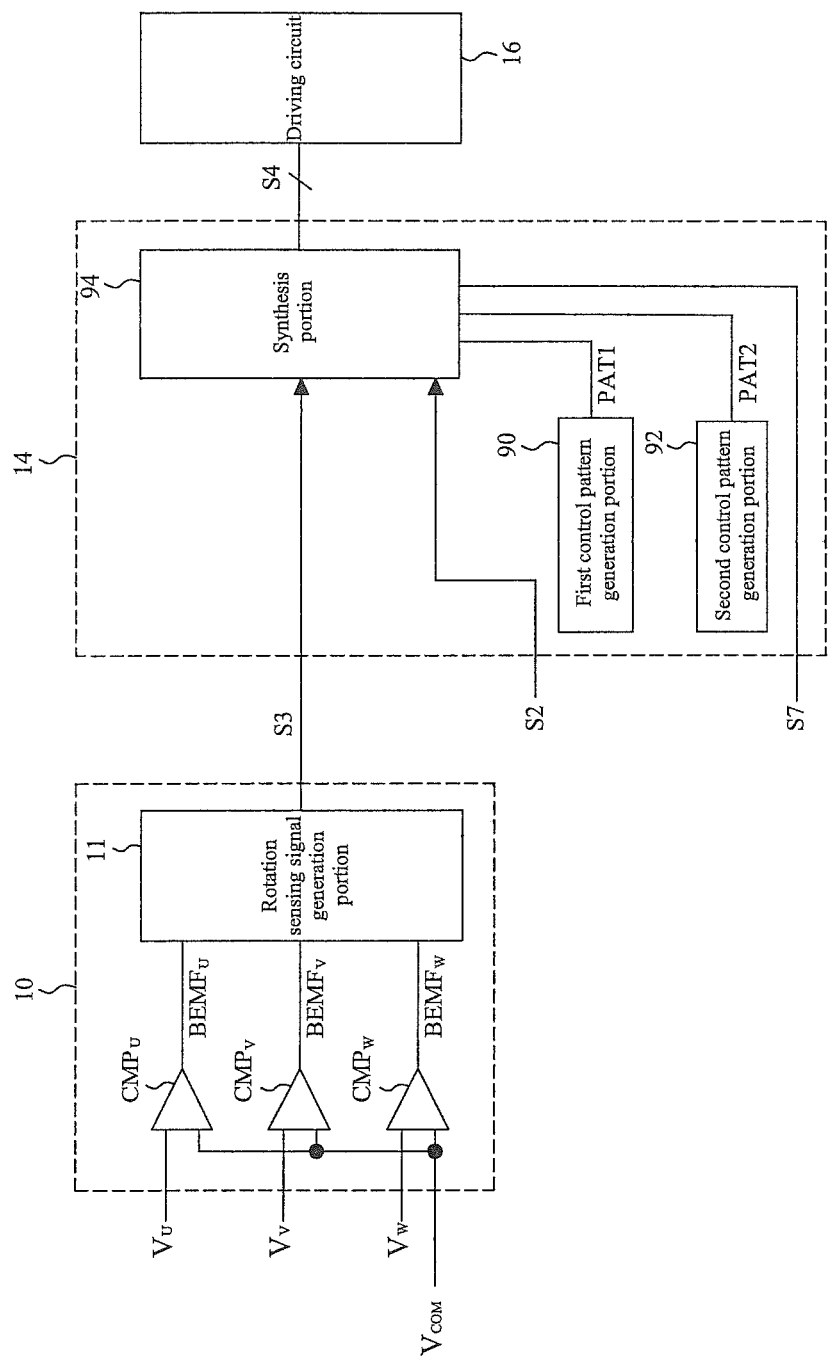
FIG. 2 is a circuit diagram illustrating an embodiment of a driving device shown in FIG. 1.

The entire constitution of the cooling device 4 was described above. An embodiment of the driving signal synthesis circuit 14 is described below. FIG. 2 is a circuit diagram illustrating an embodiment of a driving device 100 shown in FIG. 1.

The BEMF sensing circuit 10 includes a plurality of comparators $CMP_U$~$CMP_W$ and a rotation sensing signal generation portion 11. The comparators $CMP_U$~$CMP_W$ are disposed for each of the coils $L_U$~$L_W$ of the fan motor 6, respectively. Each of the comparators $CMP_U$~$CMP_W$ generates a back electromotive force sensing signal $BEMF_U$~$BEMF_W$ (it will be referred to as sensing signal below) denoting a comparison result by comparing a back electromotive force $V_U$~$V_W$ appearing at one end of each corresponding coil $L_U$~$L_W$ with a neutral-point voltage $V_{COM}$ of the coils $L_U$~$L_W$.

The rotation sensing signal generation portion 11 generates a rotation sensing signal S3 via receiving the sensing signal $BEMF_U$~$BEMF_W$ from each phase and performing a logic synthesis for them. The rotation sensing signal generation portion 11 can become a part of a synthesis portion 94.

The driving signal synthesis circuit 14 includes a first control pattern generation portion 90, a second control pattern generation portion 92, and a synthesis portion 94. The first control pattern generation portion 90 outputs a first control pattern PAT1 used to enable the fan motor 6 to rotate toward a first direction. The second control pattern generation portion 92 outputs a second control pattern PAT2 used to enable the fan motor 6 to rotate toward a second direction. The first and second control patterns PAT1, PAT2, respectively, include data that provides a signal sequence for the coil $L_U$~$L_W$ of each phase U, V, W of the fan motor 6, and store the data in a read only memory (ROM) and so on. The synthesis portion 94 reads the first control pattern PAT1 or the second control pattern PAT2 out in synchronization with the rotation sensing signal S3.

The synthesis portion 94 generates the driving control signal S4 in synchronization with the output signal of the comparators $CMP_U$~$CMP_W$, in other words, in synchronization with the rotation sensing signal S3, according to the first control pattern PAT1 while enabling the fan motor 6 to rotate toward the first direction. The synthesis portion 94 generates the driving control signal S4 in synchronization with the output signal of the comparators $CMP_U$~$CMP_W$, in other words, in synchronization with the rotation sensing signal S3, according to the second control pattern PAT2 while enabling the fan motor 6 to rotate toward the second direction. The synthesis portion 94 generates the driving control signal S4 by synthesizing the first control pattern PAT1 or the second control pattern PAT2 and the PWM control signal S2.

Figure 3:
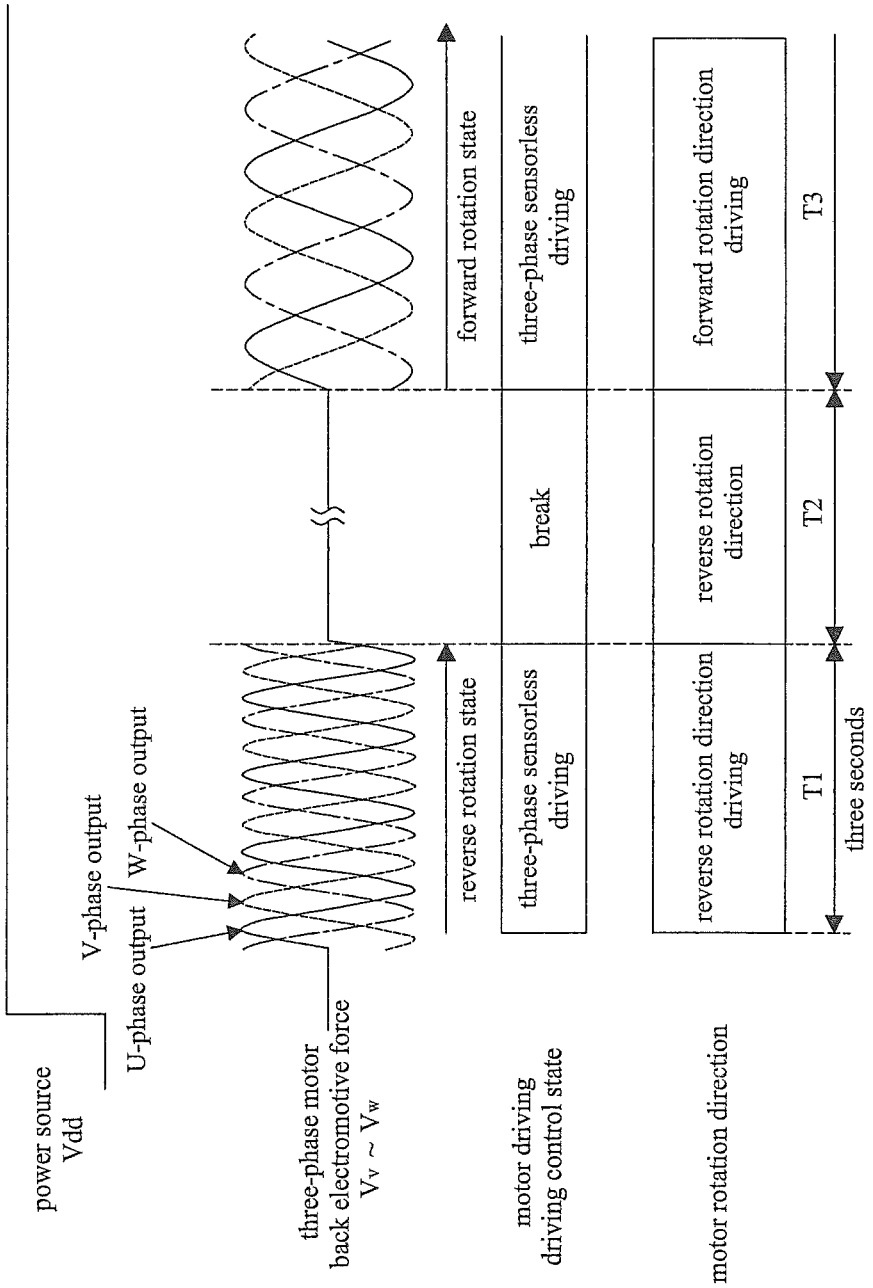
FIG. 3 is a waveform diagram illustrating state variations of the cooling device shown in FIG. 1.
Figure 4:
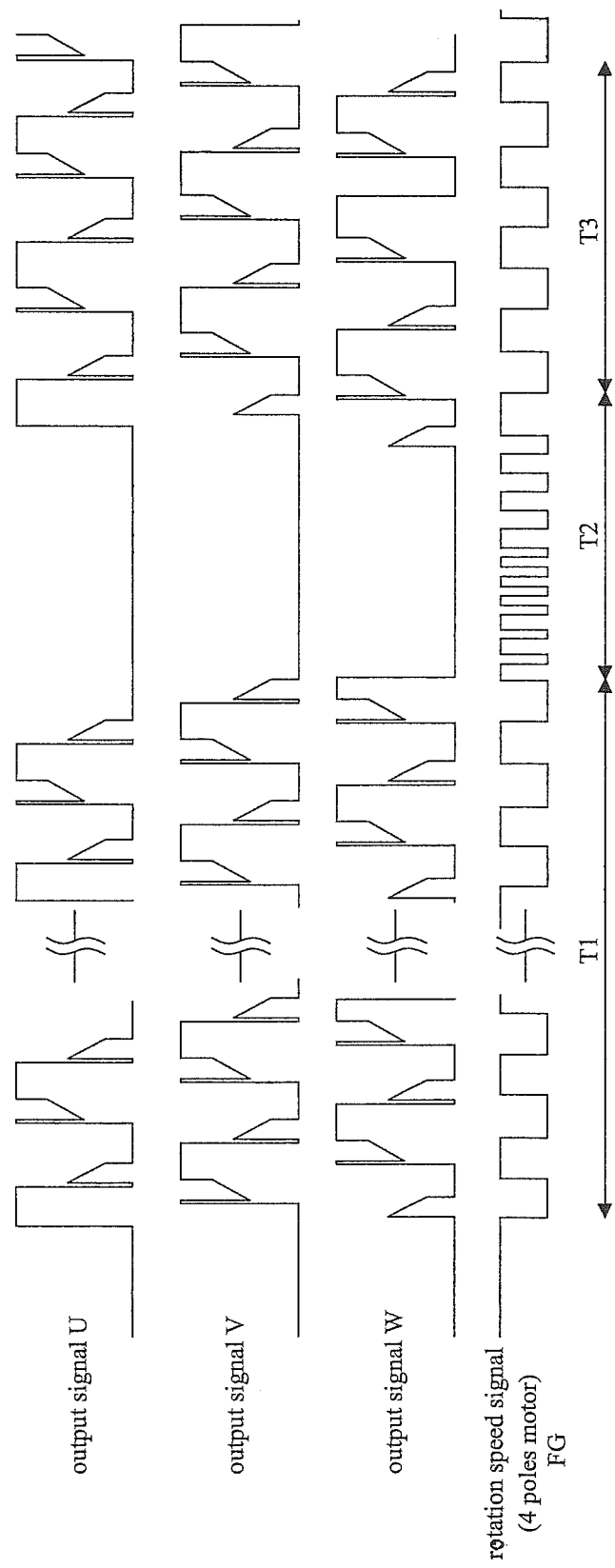
FIG. 4 is a sequence diagram illustrating driving waveforms of the cooling device shown in FIG. 1.

The constitution of the driving device 100 was described above, and its action is described below. FIG. 3 is a waveform diagram illustrating state variations of the cooling device 4 shown in FIG. 1. FIG. 4 is a sequence diagram illustrating driving waveforms of the cooling device 4 shown in FIG. 1.

The driving of the fan motor 6 is started while supplying a power source voltage Vdd to the driving device 100 in a turn-off state.

(i) First, it becomes a reverse rotation period T1. The driving device 100 provides output signals U~W shown in FIG. 4 to the fan motor 6 via a sensorless driving according to a control pattern PAT, thereby enabling the fan motor 6 to rotate toward a reverse rotation direction opposite to the direction of normal operation. The reverse rotation period T1, for example, is approximately three seconds.

(ii) In a breaking period T2, the driving device 100 applies a break to the fan motor 6 via fixing the driving signal provided to the fan motor 6. The fan motor 6 starts to reduce its rotation speed from the state rotated toward the reverse rotation direction via the break control.

(iii) Then, in a normal driving period T3, the driving device 100 provides the output signals U~W shown in FIG. 4 to the fan motor 6 via the sensorless driving according to the control pattern PAT, thereby enabling the fan motor 6 to rotate toward the direction of normal operation. Consequently, the CPU 2 is cooled.

The action of the cooling device 4 was described above.

According to the cooling device 4, dust as foreign matter that adhered to the fan motor 6 can be removed by enabling the fan motor 6 to rotate toward the opposite direction as the normal operation in the reverse rotation period T1 after starting.

The residual attachment that has not been removed performs an inertial movement in the same rotation speed as the fan. Under the state, a force can be applied in a manner enabling the dust that adhered to the fan to remove from the fan via applying the break. By this way, the attachment remained in the reverse rotation period T1 can be removed in the breaking period T2.

A life span of the cooling device 4 can be extended by removing the dust that adhered to the fan. Since the performance of the cooling device 4 is difficult to deteriorate, it can prevent the CPU 2 as the cooling target from deterioration.

In the embodiment, although the circumstances about the cooling device 4 being installed in the electronic machine to cool the CPU was described, the present invention should not be limited to the above use. The other use for cooling a heat generation body is allowable. Furthermore, the driving device 100 used for the driving of the fan motor according to the present embodiment includes, but is not limited to, the driving of other types of motors.

While several embodiments of the present invention have been illustrated and described, various modifications and improvements can be made by those skilled in the art. The embodiments of the present invention are therefore described in an illustrative but not in a restrictive sense. It is intended that the present invention should not be limited to the particular forms as illustrated and that all modifications which maintain the spirit and scope of the present invention are within the scope defined in the appended claims.

What is claimed is:

1. A driving device for a multi-phase sensorless fan motor having a plurality of coils, comprising:
    a plurality of comparators, disposed for each of the coils, respectively, and configured to generate a back electromotive force sensing signal denoting a comparison result by comparing a back electromotive force appearing at one end of each corresponding coil with a neutral-point voltage of the coils;
    a forward/reverse rotation control portion, which receives a direction control signal used to assign a rotation direction of the fan motor in the normal operation to a first direction or a second direction opposite to the first direction, and outputs a signal to switch the rotation direction of the fan motor according to the direction control signal;
    a driving signal synthesis circuit, configured to generate a driving control signal used to drive the fan motor according to an output signal of the comparators and the output signal of the forward/reverse rotation control portion; and a driving circuit, for driving the fan motor according to the driving control signal, wherein the driving signal synthesis circuit comprises:

a first control pattern generation portion, for outputting a first control pattern used to enable the fan motor to rotate toward the first direction; and a second control pattern generation portion, for outputting a second control pattern used to enable the fan motor to rotate toward the second direction; and wherein the driving signal synthesis circuit is structured to perform:

(i) generating the driving control signal according to either the first control pattern or the second control pattern for enabling the fan motor to rotate toward a direction opposite to the rotation direction assigned by the direction control signal within a specific reverse rotation period after a driving of the fan motor is started, (ii) generating the driving control signal for applying a brake to the fan motor within a braking period, and (iii) generating the driving control signal according to either the first control pattern or the second control pattern for enabling the fan motor to rotate toward a direction of normal operation in a normal driving period.

2. The driving device of claim 1, wherein the driving signal synthesis circuit comprises:

a synthesis portion, for generating the driving control signal in synchronization with the output signal of the comparators according to the first control pattern while enabling the fan motor to rotate toward the first direction, and for generating the driving control signal in synchronization with the output signal of the comparators according to the second control pattern while enabling the fan motor to rotate toward the second direction.

3. A cooling device, comprising:
a sensorless fan motor having a plurality of coils; and
a driving device for driving the sensorless fan motor as in claim 1.

4. A cooling device, comprising:
a sensorless fan motor having a plurality of coils; and
a driving device for driving the sensorless fan motor as in claim 2.

* * * * *